Patented Aug. 12, 1952

2,606,812

UNITED STATES PATENT OFFICE 2,606,812

POTASSIUM STANNOUS FLUORIDE

William F. Bruce, Havertown, Pa., assignor to Wyeth Incorporated, Philadelphia, Pa., a corporation of Delaware No Drawing. Application August 31, 1951, Serial No. 244,717

4 Claims. (Cl. 23—88)

This invention relates to a new composition of matter, namely potassium stannous fluoride having the formula $SnF_2 \cdot KF$, and to a method for preparing the same.

It has been discovered that when solutions of potassium fluoride and stannous chloride are mixed, there are formed small white crystalline platelets having a melting point of about 240–242° C. These crystals have been found to have the composition $SnF_2 \cdot KF$.

The product of the invention has been found useful in several ways. For example, cellulose materials, such as paper, are rendered fireproof by impregnation with a saturated solution of potassium stannous fluoride. The process has also been found to be useful in separating tin from some of its common impurities such as lead when they are in solution together in the form of their soluble salts. As still another example of utility, the compound of the invention, being somewhat soluble, is deemed useful in the form of a water solution for topical application to the teeth for increasing their hardness index and making them resistant to decay.

The novel complex compound of the invention has advantages over the individual compounds stannous fluoride and potassium fluoride since unlike stannous fluoride which is unstable and spontaneously decomposes in the presence of air and moisture to form $SnOF_2$, or potassium fluoride which attacks glass and therefore must be kept in wax bottles and is dangerous to handle, $SnF_2 \cdot KF$ is stable under dry storage conditions for long periods of time and can be kept in ordinary glass containers.

In order to prepare the novel compound, it is desirable to first prepare oxygen-free water for the reaction. This has been found advantageous in view of the fact that the starting stannous salts used are easily oxidized by dissolved oxygen to stannic salts which form contaminating insoluble compounds in the reaction. Since the contamination will be slight in any case, this need not be done if minor amounts of impurities are not objected to. In the preferred process of the invention, however, the water for the solutions is made oxygen-free by boiling or any other suitable process and the reactants are protected from air at all times by any suitable means, such as keeping them under any inert or reducing gas (e. g. nitrogen, hydrogen, etc.).

With this oxygen-free water relatively concentrated solutions of potassium fluoride and stannous chloride are then prepared. Any suitable forms of these salts may be used, however, the cheapest and most soluble forms are the various hydrates of potassium fluoride and stannous chloride.

The operable concentrations of these solutions are limited only by the need for exceeding the solubility product of $SnF_2 \cdot KF$ in the final mixture in order for the product to crystallize out of solution. As previously pointed out, $SnF_2 \cdot KF$ is soluble in water up to about 10% by weight at room temperature and when working at such temperature it is preferred to prepare solutions of potassium fluoride of about 40–80% by weight and of stannous chloride of about 30–60% by weight.

The stannous chloride and potassium fluoride solutions are then mixed in a general ratio of about one mole of stannous chloride to two moles of potassium fluoride. The mixing may be carried out in any suitable manner and in open or closed containers. As indicated before, it is preferred to operate with a closed container under nitrogen atmosphere until the $SnF_2 \cdot KF$ is formed, in order to prevent any oxidation of the stannous to stannic salts. No rigid limitations of temperature of reaction exist. However, it is preferred to have the reaction take place at room temperature because of the tendency of stannous compounds to hydrolyze and form insoluble precipitates.

The solution is then cooled to about 5° C. and the precipitate filtered off by any suitable means and washed with small amounts of cold water and dried.

The following example is illustrative of the practice of the invention:

To 228 g. of potassium fluoride ($KF \cdot 2H_2O$) in 100 cc. of oxygen-free distilled water in a 2 liter Erlenmeyer flask under nitrogen was added 225 g. of stannous chloride ($SnCl_2 \cdot 2H_2O$) in 300 cc. of water. An immediate precipitate of flaky crystals formed. After cooling to about 5° C., the product was filtered and dried in a vacuum desiccator. The dried product melted at 240–242° C. with decomposition.

Analysis: Calculated for $SnF_2 \cdot KF$, Sn, 55.4; K, 18.2; F, 26.6. Found, Sn, 55.5; K, 15.4; F, 25.5.

I claim as my invention:

1. As a new composition of matter, $SnF_2 \cdot KF$.

2. The method for the preparation of $SnF_2 \cdot KF$ comprising mixing aqueous solutions of potassium fluoride and stannous chloride, and then removing the precipitate from the reaction mixture.

3. The method for the preparation of $SnF_2 \cdot KF$ comprising reacting aqueous solutions of potassium fluoride and stannous chloride under non-oxidizing conditions and then isolating the precipitate from said mixture.

4. The method for the preparation of $SnF_2 \cdot KF$ comprising mixing an oxygen-free aqueous solution of about 40–80% by weight of potassium fluoride with an oxygen-free aqueous solution of about 30–60% by weight of stannous chloride, cooling said mixture to about 5° C., and finally removing the precipitate from said mixture.

WILLIAM F. BRUCE.

No references cited